(12) United States Patent
Newbern et al.

(10) Patent No.: US 8,623,310 B2
(45) Date of Patent: Jan. 7, 2014

(54) PROCESS FOR PREPARING MONOBASIC PYROPHOSPHATE MATERIALS

(75) Inventors: Angela Newbern, Tuckerton, NJ (US); Robert Clyde Finn, Westfield, NJ (US)

(73) Assignee: Innophos, Inc., Cranbury, NJ (US)

( * ) Notice: Subject to any disclaimer, the term of this patent is extended or adjusted under 35 U.S.C. 154(b) by 0 days.

(21) Appl. No.: 13/029,097

(22) Filed: Feb. 16, 2011

(65) Prior Publication Data

US 2012/0301384 A1 Nov. 29, 2012

(51) Int. Cl.
*C01B 25/26* (2006.01)
(52) U.S. Cl.
USPC .......................................... 423/305
(58) Field of Classification Search
USPC .......................................... 423/305
See application file for complete search history.

(56) References Cited

U.S. PATENT DOCUMENTS

2009/0078158 A1 * 3/2009 Matsuda et al. .............. 106/462

FOREIGN PATENT DOCUMENTS

| AU | 200047547 B2 | 11/2000 |
| WO | WO 0068145 A1 * | 11/2000 |
| WO | 2005014474 A2 | 2/2005 |

* cited by examiner

*Primary Examiner* — Steven Bos
*Assistant Examiner* — Justin Bova
(74) *Attorney, Agent, or Firm* — Joanne P. Will

(57) ABSTRACT

The present invention relates to a process for preparing a material having the formula:

$$(M_xH_y)^{+4}(P_2O_7)^{-4}:$$

where M is a cation selected from the group consisting of monovalent cations, divalent cations, and trivalent cations; H is hydrogen, $P_2O_7$ is the pyrophosphate anion, and y is a number between 2.2 and 3.8; and x is a value sufficient to balance the overall charge of said compound comprising mixing and heating 105-112% polyphosphoric acid or pyrophosphoric and a compound having a monovalent metal cation or a compound having a divalent metal cation or a compound having a trivalent metal cation.

2 Claims, 5 Drawing Sheets

Figure 4. Acrylamide content of French fries (potato strips soaked in 1% solution at room temperature for 35 min)

Acrylamide content of French fries (potato strips blanched in water at 65°C for 20 min and soaked in 1% solution at room temperature for 10 min);

PROCESS FOR PREPARING MONOBASIC PYROPHOSPHATE MATERIALS

BACKGROUND OF THE INVENTION (1) Field of the Invention

The present invention relates to a process for preparing monobasic pyrophosphates. These compounds possess features that are useful in a wide variety of industries including, but not limited to, food processing, pet food processing, and as specialty industrial chemicals.

(2) Description of the Related Art

Acidic pyrophosphate compounds can be prepared by the following type of reaction where sodium is the exemplary metal: 2 $NaH_2PO_4$ is heated to form a dibasic pyrophosphate ($Na_2H_2P_2O_7$) and $H_2O$. Thus, it would appear that the associated monobasic pyrophosphate could be prepared by a similar reaction involving $NaH_2PO_4$, Phosphoric acid ($H_3PO_4$), and heat. This is not the case, however. Different species that are not exclusively pyrophosphate form, reducing the yield and the associated utility, and the resulting mixed material is hard to handle because it melts at ~150 C and cools to a glassy state.

Monobasic pyrophosphates (of which the sodium form, $NaH_3P_2O_7$ has been most widely studied) have been prepared by a process wherein glassy sodium polyphosphate is tempered as a fine powder at 100-200 degrees Centigrade in damp air with a water vapour pressure of 10-200 mbar or in a polar solvent in which the phosphate is insoluble, in the presence of a quantity of water sufficient for hydrolysis, until the mass has overwhelmingly been converted to $NaH_3P_2O_7$. See, AU 2004/47547 (Patent Number 771905) assigned to BK Giulini.

Additionally, DE 10336363 (WO 2005014474) assigned to PEMEAS GMBH discloses a method for producing crystalline pyrophosphates of the Formula 1: $MP_2O_7$ by heating a hydrogen phosphate of the Formula II: M $(HPO_4)_2$n $H_2O$ in a suitable liquid medium, where M is a tetravalent metal of the Group IV a or IV b and n is a number from 0-20, and the resultant compound of Formula 1 has a particle size of 1-1000 nm. Preferably, M is Ti, Zr, Si, Sn, Ge, or Sn, in particular Ti or Zr, and as such these materials are best denoted as tetrabasic. Polyphosphoric acid, phosphorus (V) oxide and orthophosphoric acid or mixtures thereof are preferably used as the liquid medium. The crystalline pyrophosphates of Formula 1 produced according to said method are suitable for use as additives in fuel cells, and for ceramics or as catalysts in organic reactions. It is expected that similar reaction chemistry with different feedstocks would yield monobasic pyrophosphates.

Now, Applicants have discovered a novel process for preparing monobasic pyrophosphate compounds. Moreover, Applicants' process is less time consuming and simpler. For example, the AU 771905 process requires a tempering hold time that is measured in days or weeks. Also, the DE 10336363 process is conducted in a solvent, and requires separate filtration step. Applicants' process does not require the preparation of a glassy melt or a tempering or filtration step. Finally, Applicants' simpler process results in greater yields since all inputs result in usable product.

SUMMARY OF THE INVENTION

The present invention relates to a process for preparing a material having the formula:

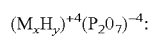

where M is a cation selected from the group consisting of monovalent cations, divalent cations, and trivalent cations; H is hydrogen, $P_2O_7$ is the pyrophosphate anion, and y is a number between 2.2 and 3.8; and x is a value sufficient to balance the overall charge of said compound, comprising the steps of:

a. mixing equal parts (on a mole basis) of 105-112% polyphosphoric acid and a compound having a monovalent metal cation or a compound having a divalent metal cation or a compound having a trivalent metal cation;
b. heating the mixture prepared in step a.;
c. mixing the heated step b. mixture.

The present invention also relates to a process for preparing a material compound having the formula:

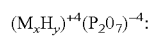

where M is a cation selected from the group consisting of monovalent cations, divalent cations, and trivalent cations; H is hydrogen, $P_2O_7$ is the pyrophosphate anion, and y is a number between 2.2 and 3.8, and wherein further if M is a monovalent cation, then x=4−y; further provided if M is a divalent cation, then x=(4−y)/2; wherein further if M is a trivalent cation, then x=(4−y)/3, comprising the steps of:

a. mixing equal parts (on a mole basis) of 105-112% polyphosphoric acid and a compound having a monovalent metal cation or a compound having a divalent metal cation or a compound having a trivalent metal cation;
b. heating the mixture prepared in step a.;
c. mixing the heated step b. mixture.

The present invention further relates to a process for preparing a material having the formula:

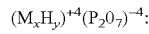

where M is a cation selected from the group consisting of monovalent cations, divalent cations, and trivalent cations; H is hydrogen, $P_2O_7$ is the pyrophosphate anion, and y is a number between 2.2 and 3.8; and x is a value sufficient to balance the overall charge of said compound, comprising the steps of:

a. mixing equal parts (on a mole basis) of pyrophosphoric acid and a compound having a monovalent metal cation or a compound having a divalent metal cation or a compound having a trivalent metal cation;
b. heating the mixture prepared in step a.;
c. mixing the heated step b. mixture.

The present invention also relates to a process for preparing a material having the formula:

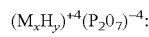

where M is a cation selected from the group consisting of monovalent cations, divalent cations, and trivalent cations; H is hydrogen, $P_2O_7$ is the pyrophosphate anion, and y is a number between 2.2 and 3.8, and wherein further if M is a monovalent cation, then x=4−y; further provided if M is a divalent cation, then x=(4−y)/2; wherein further if M is a trivalent cation, then x=(4−y)/3, comprising the steps of:

a. mixing equal parts (on a mole basis) of pyrophosphoric acid and a compound having a monovalent metal cation or a compound having a divalent metal cation or a compound having a trivalent metal cation;
b. heating the mixture prepared in step a.;
c. mixing the heated step b. mixture.

DEFINITIONS AND USAGES OF TERMS

Figure 1:
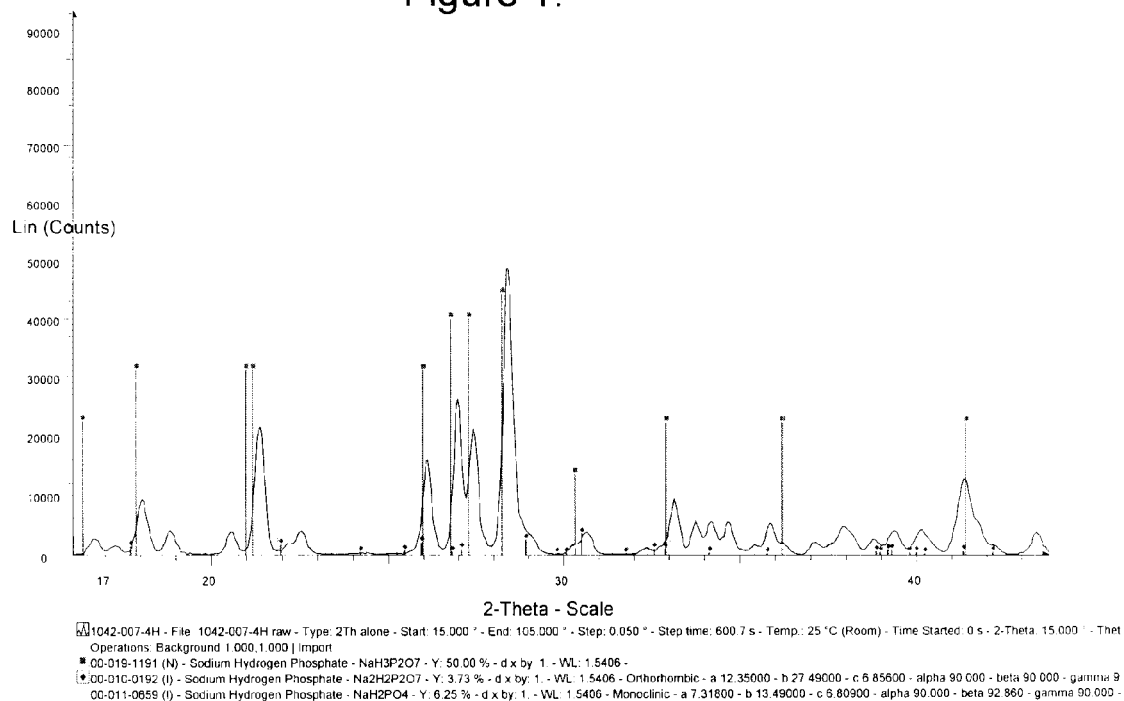
FIG. 1 is an X ray diffractometer illustrating the practice of the present invention.

Cations are positively charged dissolved elements which will normally try to combine with or attach to an anion.

The term "mixing" as used herein means mixing of sufficient intensity to mix high viscosity materials, said materials having viscosities equal to or greater than 200,000 cps (centipoise)

The term "heating" as used herein means heating to a temperature range of 110-180 C.

In another embodiment, heating may occur at 120-170 C, and in a further embodiment, heating may occur at about 160 C.

"Polyphosphoric acid" (PPA) is a clear viscous liquid comprised of a mixture of ortho, pyro, tripoly, tetrapoly and higher condensed acids of the general formula $H_{n+2}P_nO3_{n+1}$". In the practice of the present invention, 105-112% polyphosphoric acid, on a $H_3PO_4$ basis, is used. The degree of condensation is often referred to in terms of "percent phosphoric acid", for example 108% PPA" (phosphoric acid basis) is equivalent to 78% on a $P_2O_5$ (diphosphorus pentoxide) basis.

"Pyrophosphoric acid" is $H_4P_2O_7$. It is a solid a room temperature.

Orthophosphoric acid is $H_3PO_4$

Tripolyphosphoric acid is $H_5P_3O_{10}$

Tetrapolyphosphoric acid is $H_6P_4O_{13}$ $P_2O_7$ is the pyrophosphate anion, also known as diphosphate.

The term "compound having a monovalent cation" refers to compounds including but not limited to SAPP (sodium acid pyrophosphate), KAPP (potassium acid pyrophosphate), Cuprous pyrophosphate, and ammonium pyrophosphate and sodium carbonate ($Na_2CO_3$). SAPP is a nonlimiting example of a compound having a monovalent metal cation. More specifically, SAPP is a dimetal dihydrogen pyrophosphate wherein the monovalent metal is sodium, and where in the acronym stands for sodium acid pyrophosphate. SAPP has the formula $Na_2H_2P_2O_7$ The term "compound having a divalent cation" refers to compounds including, but not limited to, metal oxides such as, MgO, CaO, ZnO, CrO, CuO, and MnO.

The term "compound having a trivalent cation" refers to compounds including, but not limited to, metal oxides such as $Al_2O_3$ and $Fe_2O_3$

DETAILED DESCRIPTION OF THE INVENTION

The present invention relates to a process for preparing a material having the formula:

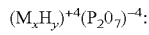

$(M_xH_y)^{+4}(P_2O_7)^{-4}$:

where M is a cation selected from the group consisting of monovalent cations, divalent cations, and trivalent cations; H is hydrogen, $P_2O_7$ is the pyrophosphate anion, and y is a number between 2.2 and 3.8; and x is a value sufficient to balance the overall charge of said compound, comprising the steps of:

a. mixing equal parts (on a mole basis) of 105-112% polyphosphoric acid and a compound having a monovalent metal cation or a compound having a divalent metal cation or a compound having a trivalent metal cation;
b. heating the mixture prepared in step a.;
c. mixing the heated step b. mixture.

The present invention also relates to a process for preparing a material having the formula:

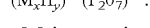

$(M_xH_y)^{+4}(P_2O_7)^{-4}$:

where M is a cation selected from the group consisting of monovalent cations, divalent cations, and trivalent cations; H is hydrogen, $P_2O_7$ is the pyrophosphate anion, and y is a number between 2.2 and 3.8, and wherein further if M is a monovalent cation, then x=4−y; further provided if M is a divalent cation, then x=(4−y)/2; wherein further if M is a trivalent cation, then x=(4−y)/3, comprising the steps of:

a. mixing equal parts (on a mole basis) of 105-112% polyphosphoric acid and a compound having a monovalent metal cation or a compound having a divalent metal cation or a compound having a trivalent metal cation;
b. heating the mixture prepared in step a.;
c. mixing the heated step b. mixture.

The present invention further relates to a process for preparing a material having the formula:

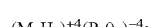

$(M_xH_y)^{+4}(P_2O_7)^{-4}$:

where M is a cation selected from the group consisting of monovalent cations, divalent cations, and trivalent cations; H is hydrogen, $P_2O_7$ is the pyrophosphate anion, and y is a number between 2.2 and 3.8; and x is a value sufficient to balance the overall charge of said compound, comprising the steps of:

a. mixing equal parts (on a mole basis) of pyrophosphoric acid and a compound having a monovalent metal cation or a compound having a divalent metal cation or a compound having a trivalent metal cation;
b. heating the mixture prepared in step a.;
c. mixing the heated step b. mixture.

The present invention also relates to a process for preparing a material having the formula:

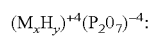

$(M_xH_y)^{+4}(P_2O_7)^{-4}$:

where M is a cation selected from the group consisting of monovalent cations, divalent cations, and trivalent cations; H is hydrogen, $P_2O_7$ is the pyrophosphate anion, and y is a number between 2.2 and 3.8, and wherein further if M is a monovalent cation, then x=4−y; further provided if M is a divalent cation, then x=(4−y)/2; wherein further if M is a trivalent cation, then x=(4−y)/3, comprising the steps of:

a. mixing equal parts (on a mole basis) of pyrophosphoric acid and a compound having a monovalent metal cation or a compound having a divalent metal cation or a compound having a trivalent metal cation;
b. heating the mixture prepared in step a.;
c. mixing the heated step b. mixture.

Non Limiting Examples of Monobasic Pyrophosphate Materials Prepared by the Process of the Present Invention

Monovalent Monometal Pyrophosphates

Monosodium hydrogen pyrophosphate —$(NaH_3)^{+4} (P_2O_7)^{-4}$
Monopotassium hydrogen pyrophosphate —$(KH_3)^{+4} (P_2O_7)^{-4}$
MonoAmmonium hydrogen pyrophosphate —$(NH_4H_3)^{+4} (P_2O_7)^{-4}$
Monocupric hydrogen pyrophosphate —$(CuH_3)^{+4}(P_2O_7)^{-4}$ Divalent Monometal Pyrophosphates Monocalcium hydrogen dipyrophosphate —$(CaH_6)^{+8}$ $((P_2O_7)^{-4})_2$
Monomagnesium hydrogen dipyrophosphate $(MgH_6)^{+8}$ $((P_2O_7)^{-4})_2$
Monozinc hydrogen dipyrophosphate —$(ZnH_6)^{+8}((P_2O_7)^{-4})_2$
Monochromium hydrogen dipyrophosphate —$(ZnH_6)^{+8}$ $((P_2O_7)^{-4})_2$
Monocupric hydrogen dipyrophosphate —$(CuH_6)^{+8}((P_2O_7)^{-4})_2$
Monomanganese hydrogen dipyrophosphate —$(MnH_6)^{+8}$ $((P_2O_7)^{-4})_2$ Trivalent Monometal Pyrophosphates Monoaluminium hydrogen tripyrophosphate —$(AlH_9)^{+12}$ $((P_2O_7)^{-4})_3$
Monoferric hydrogen tripyrophosphate —$(FeH_9)^{+12}$ $((P_2O_7)^{-4})_3$ Preparing the Monobasic Pyrophosphate Materials of the Present Invention In an embodiment of the invention, 108% polyphosphoric acid (PPA) or pyrophosphoric acid ($H_4P_2O_7$) is mixed with equal parts (on a mole basis) of SAPP ($Na_2H_2P_2O_7$) and heated to 16° C. to form $NaH_3P_2O_7$ (monosodium hydrogen pyrophosphate).

In another embodiment of the invention, pyrophosphoric acid ($H_4P_2O_7$) or 105% PPA is mixed with a metal oxide powder, wherein said metal species is divalent, such as MgO, and heated at 160 C to form monomagnesium hydrogen dipyrophosphate.

In yet another embodiment of the invention, pyrophosphoric acid ($H_4P_2O_7$) or 110% PPA is mixed with a metal oxide powder, wherein said metal species is trivalent, such as $Fe_2O_3$, and heated at 160 C to form monoferric hydrogen tripyrophosphate.

In an embodiment of the invention, heating is conducted at a temperature range of about 110-180 C. In another embodiment, said temperature range is 120-170 C. In yet another embodiment, the temperature is 160 C.

In a further embodiment of the invention, 105-112% PPA is comprised of the following percentages of acid species:
Orthophosphoric acid species—less than or equal to 40%
Pyrophosphoric acid species—40-50%

The following non limiting examples illustrate the practice of the process of the present invention.

Examples 1-7 were prepared with solid pyrophosphoric acid ($H_4P_2O_7$) which is a solid at room temperature.

Example 1

Figures 1024-007-4H 374.38 g of sodium acid pyrophosphate (SAPP) was added to the mixing bowl of a Cuisinart® food processor equipped with a chopping blade. 300.63 g of solid $H_4P_2O_7$ (pyrophosphoric acid) was then added to the SAPP in said mixing bowl. The food processor cover was put in place and the SAPP and the solid $H_4P_2O_7$ were mixed together by the chopping action of the blade. The sides and the bottom of the food processor were occasionally scraped to remove product that had clumped up. The SAPP/solid $H_4P_2O_7$ mixture became a dry blend at first, and then the heat of reaction caused the mixture to form a wet pasty solid. As mixing continued, this paste continued to solidify. Upon further mixing the hardened solid was chopped up into small granules. The resultant granular product was placed in a glass dish and dried in a 160 C oven for 4 hours. The product yield was 97.6%. Final sample had 15.7% $PO_4$ and 84% $P_2O_7$ with a 96.6% assay by IC analysis. The pH of a 1% (w/w) solution was 2.07, and the X-Ray Diffractometer (XRD) profile closely matched that expected from pure monosodium pyrophosphate.

Example 2

278.36 g of sodium acid pyrophosphate (SAPP) was added to the mixing bowl of a CUISINART® is a registered Trademark of Cuisinart, Inc, Stamford, Conn. food processor equipped with a chopping blade. 223.13 g of solid $H_4P_2O_7$ was then added to the SAPP in said mixing bowl. The food processor cover was put in place and the SAPP and the solid $H_4P_2O_7$ were mixed together by the chopping action of the blade. The sides and the bottom of the food processor were occasionally scraped to remove product that had clumped up. The SAPP/solid $H_4P_2O_7$ mixture became a dry blend at first, and then the heat of reaction caused the mixture to form a wet pasty solid. As mixing continued, this paste continued to solidify. Upon further mixing the hardened solid was chopped up into small granules. The resultant granular product was placed in a glass dish and dried in a 160 C oven for 4 hours.

Example 3

Figure 1042-020

312.28 g of sodium acid pyrophosphate (SAPP) was added to the mixing bowl of a CUISINART® is a registered Trademark of Cuisinart, Inc, Stamford, Conn. food processor equipped with a chopping blade. 250.82 g of sold $H_4P_2O_7$ was then added to the SAPP in the mixing bowl. The food processor cover was put in place and the SAPP and the solid $H_4P_2O_7$ were mixed together by the chopping action of the blade. The sides and the bottom of the food processor were occasionally scraped to remove product that had clumped up. The SAPP/solid $H_4P_2O_7$ mixture became a dry blend at first, and then the heat of reaction caused the mixture to form a wet pasty solid. As mixing continued, this paste continued to solidify. Upon further mixing the hardened solid was chopped up into small granules. The resultant granular product was placed in a glass dish and dried in a 160 C oven for 4 hours. The product yield was 93.0%. The sample heated for 5 hours had 8.9% $PO_4$ and 87.1% $P_2O_7$ with a 100.1% assay by IC analysis. The sample heated for 10 hours had 2.7% $PO_4$ and 93.6% $P_2O_7$ with a 107.6% assay. The XRD profile closely matched that expected from pure monosodium pyrophosphate.

Example 4

124 g of sodium acid pyrophosphate (SAPP) was added to the mixing bowl of a CUISINART® is a registered Trademark of Cuisinart, Inc, Stamford, Conn. food processor equipped with a chopping blade. 100 g of solid $H_4P_2O_7$ was then added to the SAPP in the mixing bowl. The cover was placed on the mixing bowl and the SAPP and solid $H_4P_2O_7$ were mixed by chopping. Mixing continued until a dry blend was formed. Said dry blend was placed in a glass dish and dried in a 160 C oven for 6 hours.

Example 5

312.38 g of sodium acid pyrophosphate (SAPP) was added to the mixing bowl of a CUISINART® is a registered Trademark of Cuisinart, Inc, Stamford, Conn. food processor equipped with a chopping blade. 251.15 g of solid $H_4P_2O_7$ was then added to the SAPP in the mixing bowl. The food processor cover was put in place and the SAPP and the solid $H_4P_2O_7$ were mixed together by the chopping action of the blade. The sides and the bottom of the food processor were occasionally scraped to remove product that had clumped up. The SAPP/solid $H_4P_2O_7$ mixture became a dry blend at first, and then, the heat of reaction caused the mixture to form a wet pasty solid. As mixing continued, this paste continued to solidify. Upon further mixing the hardened solid was chopped up into small granules. The resultant granular product was placed in a glass dish and dried in a 160 C oven for 20 hours. The product yield was 96%. Final sample had 1.2% $PO_4$ and 94.2% $P_2O_7$ with a 108.3% assay by IC analysis. The pH of a 1% (w/w) solution was 2.15.

Example 6

FIG. 1042-082-2

312.91 g of sodium acid pyrophosphate (SAPP) was added to the mixing bowl of a CUISINART® is a registered Trademark of Cuisinart, Inc, Stamford, Conn. food processor equipped with a chopping blade. 250.96 g of solid $H_4P_2O_7$ was then added to the SAPP in the mixing bowl. The food processor cover was put in place and the SAPP and solid $H_4P_2O_7$ were mixed by chopping. The bottom and sides of the mixing bowl were scraped to remove product that had clumped up. The mixture became a dry blend at first, and then, due to the heat of reaction, turned into a wet pasty solid. As mixing continued, this paste continued to solidify. Upon further mixing, said hardened, solid product was chopped up into small granules. The resultant solid product was then placed in a glass dish and dried in a 160 C oven for 20 hours. The product yield was 95%. Final sample had 1.4% $PO_4$ and 93.9% $P_2O_7$ with a 107.9% assay by IC analysis. The pH of a 1% (w/w) solution was 2.17, and the XRD profile closely matched that expected from pure monosodium pyrophosphate.

Example 7

100.81 g of sodium acid pyrophosphate (SAPP) was added to the mixing bowl of a CUISINART® is a registered Trademark of Cuisinart, Inc, Stamford, Conn. food processor equipped with a chopping blade. 100.86 g of solid $H_4P_2O_7$ was then added to the SAPP in the mixing bowl. The food processor cover was put in place and the SAPP and solid $H_4P_2O_7$ were mixed by chopping. The bottom and sides of the mixing bowl were scraped to remove product that had clumped up. The mixture became a dry blend at first, and then, due to the heat of reaction, turned into a wet pasty solid. As mixing continued, this paste continued to solidify. Upon further mixing, said hardened, solid product was chopped up into small granules. The resultant solid product was then placed in a glass dish and dried in a 160 C oven for 20 hours.

The following Examples 1, 2 and 3 were prepared with 108% liquid polyphosphoric acid (PPA)

Example 1

124.65 g of sodium acid pyrophosphate (SAPP) was added to the mixing bowl of a CUISINART® is a registered Trademark of Cuisinart, Inc, Stamford, Conn. art food processor equipped with a chopping blade. 102.15 g of 108% polyphosphoric acid (PPA) was then added to the SAPP in the mixing bowl. The food processor cover was put in place and the SAPP and the 108% polyphosphoric acid (PPA) were mixed by chopping. The bottom and sides of the food processor were occasionally scraped during mixing to remove product that had clumped up. The mixture became a dry blend at first, and then formed small balls. As mixing continued these small balls became bigger and formed one clump that turned into a wet taffy-like solid. Mixing was continued until the processor could no longer mix the product. The product was placed in a glass dish and then heated in an oven at 160 C for 22 hours Final sample had 2% $PO_4$ and 90.4% $P_2O_7$ with a 103.9% assay by IC analysis. The pH of a 1% (w/w) solution was 2.01.

Example 2

124.48 g of sodium acid pyrophosphate (SAPP) was added to a tall beaker. 103.99 g of 108% polyphosphoric acid (PPA) was then added to the beaker containing the SAPP. The SAPP and 108% polyphosphoric acid (PPA) were mixed by hand using a spatula. The mixture became a dry blend at first and then clumped up. Said clump could be pulled apart and had a sticky and stretchy consistency similar to taffy. This resultant product was placed in a glass dish and then in an oven at 110C. After 10 minutes the taffy-like solid product was a pasty liquid. After 3 hr and 45 minutes of being in the oven, the product was one dry solid piece. Said solid piece was ground up into smaller chunks and placed in an oven at 160 C for 6 hours.

Example 3

191.50 g sodium acid pyrophosphate (SAPP) was added to the mixing bowl of a KITCHENAIDE® is a registered Trademark of Kitchen Aide, St Joseph, Mich. mixer. 154.59 g of 108% polyphosphoric acid (PPA) was slowly, by spoonful, added to the SAPP in the mixing bowl. The mixture slowly started to clump into small balls and then formed one big ball. Mixing stalled until the ball was broken up by a spatula. As the ball sat, it turned into a wet paste that stuck to the sides of the mixing bowl. The sides and bottom of the bowl were occasionally scraped as mixing of the wet paste continued. The product heated up a little but did not dry out. Said product was then placed in a glass dish in a 160 C oven for 3 hrs. Said oven heated product was a dry solid that could be crushed to a powder.

Use of the Materials of the Present Invention in Preparing Carbohydrate Rich Foods.

The materials prepared according to the process of the present invention are useful in reducing acrylamide levels in high temperature processed carbohydrate rich foods including, but not limited to, French Fried potatoes and other potato products. The materials of the present invention were tested, in potatoes, alongside currently available acrylamide reducing methods and materials.

The following 1% solutions were prepared:
Solution 1—Solution 1 is a blend of 66.67% SAPP and 33.33% VERSACAL® CLEAR, is a calcium phosphate product and a registered Trademark of Innophos, Inc, Cranbury, N.J. (VC)
Solution 2 is an embodiment of the present invention. Said Solution 2 is a blend of 66.67% monosodiumhydrogenpyrophosphate and 33.33% MCP.H2O (Regent 12xx)
Solution 3—Solution 3 is a blend of 40% SAPP, 20% DCPD, and 40% citric acid;
Solution 4. CITROMA® is a registered Trademark of Jungbunzlauer, Inc, Basel, Switzerland and is sold as an acrylamide inhibitor).

Solutions 1, 2, 3, and 4 were prepared and diluted to concentrations of 1%.
VERSACAL® CLEAR, is a calcium phosphate product and a registered Trademark of Innophos, Inc, Cranbury, N.J. is a soluble Monocalcium Phosphate and a registered Trademark of Innophos, Inc., Cranbury, N.J.
CITROMA® is a registered Trademark of Jungbunzlauer, Inc, Basel, Switzerland and is sold as an acrylamide inhibitor) is a commercially available proprietary acrylamide inhibitor chemical from Jungbunzlauer, Inc. It is thought to be monosodium citrate
REGENT® is a monocalcium phosphate and a registered Trademark of Innophos, Inc, Cranbury, N.J. 12XX is monocalcium phosphate.
DCPD is dicalcium phosphate dihydrate.
Potatoes were processed according to Methods 1 and 2.
Method 1
Potatoes were cut into strips (0.85×0.85 cm) using a French fry cutter and the strip length was adjusted to 7 cm. The strips were then soaked in 1')/0 solutions of Solution 1, 2, 3, and 4. The soaked strips were then fried at 190° C. for 5 min.
Method 2
Potato strips (the strips were cut the same way as in Method 1) were first blanched in distilled water at 65° C. for 20 min. After blanching, the strips were divided into 5 lots. One lot was soaked in distilled water as a control. Other strips were soaked in Solutions 1-4. Soaking was done for 10 min. at room temperature. Potato strips were withdrawn from the solutions and drained for 2 min prior to frying at 190° C. for 2 min. The potato strips were cooled down and frozen for 2 days before re-frying at 190° C. for an additional 2 min. Frying temperature was maintained at a constant level since the potato mass to oil mass ratio (g/g) was kept low (~0.001333).
Acrylamide Analysis
Acrylamide Formation in French Fries Using Processing Method 1
This procedure closely resembles the French fry process in establishments where products are made in one step from fresh potatoes. Immersion in Solution 2 (an embodiment of the present invention, being a blend of 66.67% monosodiumhydrogenpyrophosphate and 33.33% MCP.H2O (Regent 12xx)) for 35 min at room temperature was the most effective pre-treatment in reducing acrylamide formation in French fries compared to soaking in other solutions including CITROMA® is a registered Trademark of Jungbunzlauer, Inc, Basel, Switzerland and is sold as an acrylamide inhibitor). (FIG. 1). The designation 1-SP in FIG. 1 stands for monosodiumhydrogenpyrophosphate, a compound of the present invention.
FIG. 1. Acrylamide content of French fries (potato strips soaked in 1% solution at room temperature for 35 min)
FIG. 2. Acrylamide content of French fries (potato strips blanched in water at 65° C. for 20 min and soaked in 1% solution at room temperature for 10 min);
A: Water
B: 2 SAPP: 1 VERSACAL® CLEAR, is a calcium phosphate product and a registered Trademark of Innophos, Inc, Cranbury, N.J.
C: An embodiment of the present invention: 2 1SP:1 MCP.H2O.
D: 2SAPP:2 Citric Acid:1DCPD
E: CITROMA® is a registered Trademark of Jungbunzlauer, Inc, Basel, Switzerland and is sold as an acrylamide inhibitor).
Note: 1-SP stands for monosodiumhydrogenpyrophosphate, a compound of the present invention.

Figure 2:
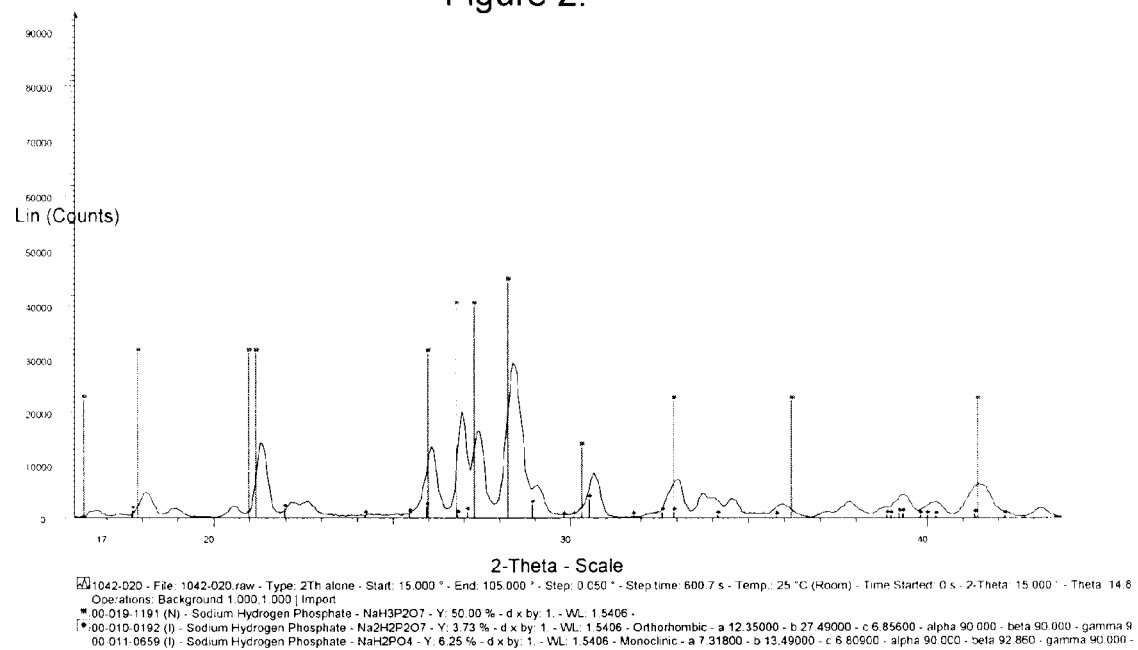
FIG. 2 is an X ray diffractometer pattern illustrating the practice of the present invention.
Figure 3:
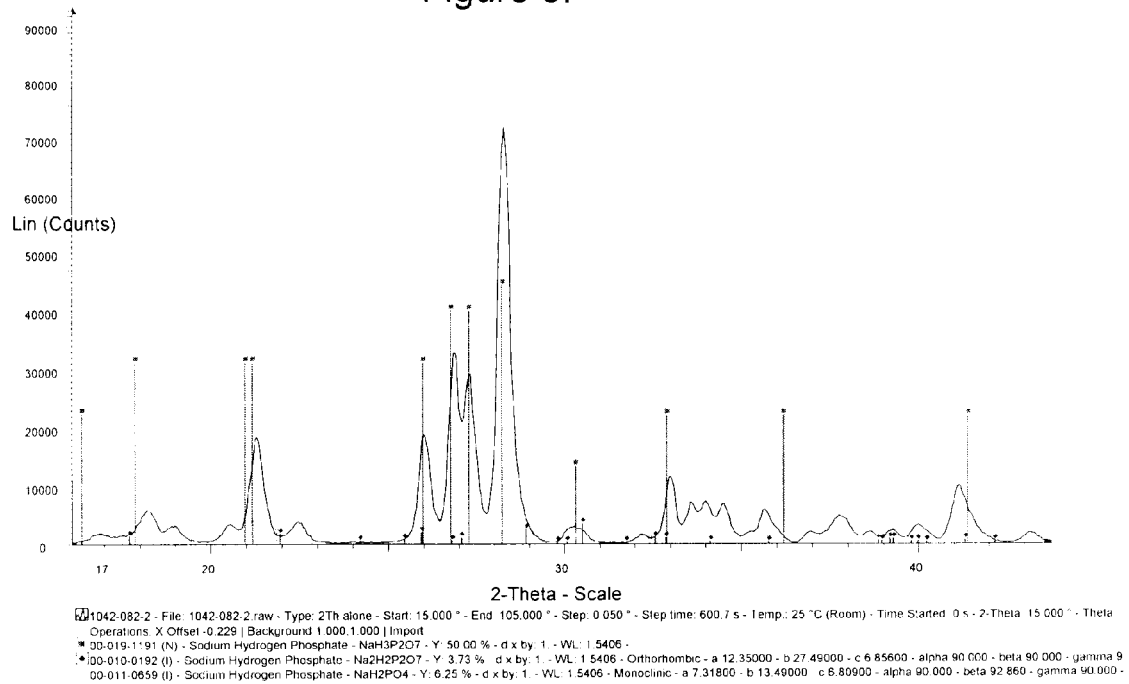
FIG. 3 is an X ray diffractometer pattern illustrating the practice of the present invention.
Figure 4:
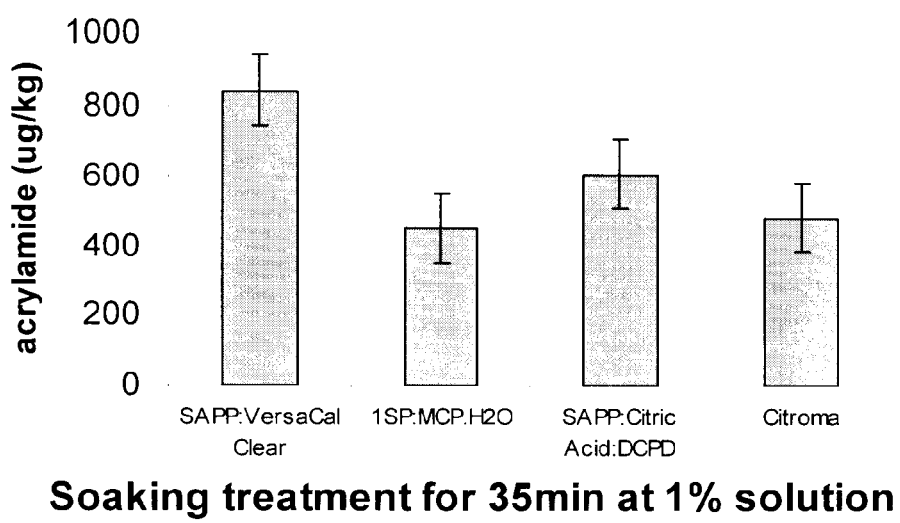
FIG. 4—Acrylamide content of French fries (potato strips soaked in 1% solution at room temperature for 35 min)
Figure 5:
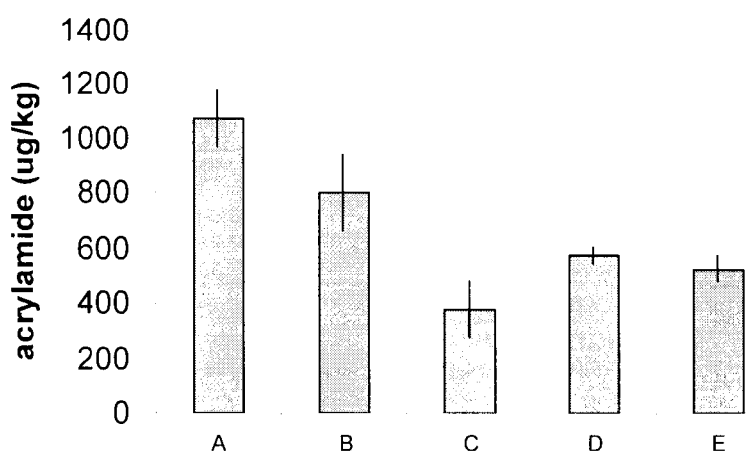
FIG. 5—Acrylamide content of French fries (potato strips blanched in water at 65 C for 20 min and soaked in 15% solution at room temperature for 10 min.

Acrylamide formation in French fries using processing Method 2
A process similar to that widely used in the consumer French fry industry was also carried out (processing Method 2). This was done to investigate if the above phosphate blends, which had the beneficial effect on acrylamide reduction in process 1 (FIG. 1), have the same effect as in an industrial procedure. FIG. 2 and Table 1 show that average acrylamide content for the control (soaked in water) was 1074 μg/kg in French fries. However, the acrylamide amount was significantly lowered by soaking with different phosphate blends (P<0.05). Among the phosphate blends, the potato strips which had been pretreated with a 1% solution of a 2:1 ratio of 1SP to MCP.H2O, an embodiment of the present invention, had only about ⅓ (65% reduction) of the acrylamide amount detected in the water soaked sample (control). Other treatments showed a higher level of acrylamide, but still lower than the control.

TABLE 1

Impact of addition of several components on the pH and acrylamide content in French fries

| Added Component | pH of solution | pH of final product | Acrylamide content (μg · kg$^{-1}$) | % change in acrylamide content compared to water treatment |
|---|---|---|---|---|
| water | | 5.38 | 1074 ± 107.5 | |
| SAPP + VersaCal ® Clear | 3.39 | 5.23 | 802.5 ± 137.5 | 25.3 c * |
| 1SP + MCP•H2O (an embodiment of the present invention) | 2.01 | 4.81 | 377.5 ± 102.5 | 64.9 a |
| SAPP + Citric Acid + DCPD | 3.27 | 5.01 | 575 ± 29.7 | 46.5 b |
| Citroma | 3.24 | 4.90 | 528 ± 45.3 | 50.8 b |

* Different letters in the same column indicate significant difference (P <0.05) by Duncan's New Range Multiple test.

We claim:
1. A process for preparing a material having the formula:

$$(M_xH_y)^{+4}(P_2O_7)^{-4}:$$

where M is a cation selected from the group consisting of monovalent cations, divalent cations, and trivalent cations; H is hydrogen, $P_2O_7$ is the pyrophosphate anion, and y is a number between 2.2 and 3.8; and x is a value sufficient to balance the overall charge of said compound comprising the steps of:
   a. mixing equal parts on a mole basis of 105-112% polyphosphoric acid and a compound having a monovalent metal cation or a divalent metal cation or a trivalent metal cation;
   b. heating the mixture prepared in step a.;
   c. mixing the heated step b. mixture.
2. A process for preparing a material having the formula:

$$(M_xH_y)^{+4}(P_2O_7)^{-4}:$$

where M is a cation selected from the group consisting of monovalent cations, divalent cations, and trivalent cations; H is hydrogen, $P_2O_7$ is the pyrophosphate anion, and y is a number between 2.2 and 3.8, and wherein further if M is a monovalent cation, then x=4−y; further provided if M is a divalent cation, then x=(4−y)/2; wherein further if M is a trivalent cation, then x=(4−y)/3 comprising the steps of:
   a. mixing equal parts on a mole basis of 105-112% polyphosphoric acid and a compound having a monovalent metal cation or a compound having a divalent metal cation or a compound having a trivalent metal cation;
b. heating the mixture prepared in step a.;
c. mixing the heated step b. mixture.

* * * * *